US006626780B2

(12) United States Patent
Fragnito (10) Patent No.: US 6,626,780 B2
(45) Date of Patent: Sep. 30, 2003

(54) POSITIVE ENGAGEMENT CONTINUOUSLY VARIABLE TRANSMISSION

(76) Inventor: Frank A. Fragnito, 11 Holmes Ave., North Babylon, NY (US) 11703

( * ) Notice: Subject to any disclaimer, the term of this patent is extended or adjusted under 35 U.S.C. 154(b) by 75 days.

(21) Appl. No.: 09/882,192

(22) Filed: Jun. 15, 2001

(65) Prior Publication Data

US 2002/0151396 A1 Oct. 17, 2002

Related U.S. Application Data

(60) Provisional application No. 60/248,578, filed on Nov. 14, 2000.

(51) Int. Cl.[7] ................................................ F16H 9/08
(52) U.S. Cl. .............................. 474/54; 474/47; 474/83
(58) Field of Search .............................. 474/47, 48, 49, 474/54, 83, 71

(56) References Cited

U.S. PATENT DOCUMENTS

| 633,234 | A | * | 9/1899 | Draullette et al. ......... 74/665 T |
| 890,879 | A | * | 6/1908 | Scriven et al. ................ 474/53 |
| 1,012,983 | A | * | 12/1911 | Caldwell ...................... 474/54 |
| 1,048,220 | A | * | 12/1912 | Sleeper ......................... 74/325 |

* cited by examiner

Primary Examiner—Thomas R. Hannon
Assistant Examiner—Vicky A. Johnson
(74) Attorney, Agent, or Firm—Alfred M. Walker (57) ABSTRACT

A continuously variable transmission includes one or more cone shaped members which each have a cone shaft centrally positioned therethrough. The cone shaped member also includes a pair of fixed spiraled grooved shafts, including a first shaft therein with a respective spiral groove that spirals in a direction 180 degrees from the direction of each spiral groove in a second fixed spiral grooved shaft. A sliding alignment guide moves laterally within each cone shaped member. Moreover, the alignment guide has a first end interacting with a keyed sprocket, having engagement teeth and an internal nib. The alignment guide has a second end interacting with a second keyed sprocket, also having engagement teeth and an internal nib. A chain interlinks with the teeth of the keyed sprockets, and interlinks with an input driving sprocket, which causes the chain to rotate, so that the input driving sprocket and the chain drive each cone shaped member while lateral adjustments change the speed ratio from the input shaft to the output shaft of each cone shaped member.

13 Claims, 14 Drawing Sheets

POSITIVE ENGAGEMENT CONTINUOUSLY VARIABLE TRANSMISSION

This application claims the benefit of Provisional application No. 60/248,578, filed Nov. 20, 2000.

FIELD OF THE INVENTION

The present invention relates to continuously variable transmissions.

BACKGROUND OF THE INVENTION

A transmission is used to match the speed and torque of a rotating load with that of the motor or engine driving it. The driven end is designated as the input while the shaft or member attached to the load is designated as the output.

In vehicular applications, the input speed is always higher than the output speed of a transmission, while in some industrial applications where high speed is required for an operation, the opposite is sometimes true. In any case, a transmission has an input and an output and has control over the ratio of rotational speed between them.

Gears have traditionally been used to achieve these speed ratios. Multiple gear sets are used within a transmission if a variety of fixed ratios is required. A more desirable device would offer the user the ability to continuously vary the speed ratio between input and output over a wide range. Continuously variable transmissions (CVT's) have been designed to achieve this result.

A wide variety of geometric alternatives and driving members have been tried over the years. Disk/disk, ball drives and belt drives have been used in CVT's. Some designs used sliding friction while others used rolling friction between members to transmit torque from input to output. While gears use mechanical interlocking to prevent slippage, friction drive elements are subject to slippage, and the size of the elements themselves must be increased or the contact forces between them must be increased (or both) to provide adequate torque capability. The measures to prevent slippage work against the dual goals of achieving compactness and low component wear. This has been the principle impediment to the broad application of CVT's in heavy-duty applications.

OBJECTS OF THE INVENTION

It is therefore an object of the present invention to provide a reliable, positive, infinitely variable speed transmission, which controls ratio control, while minimizing slippage and preventing component wear and tear.

SUMMARY OF THE INVENTION

The present invention combines the desirable feature of the continuously variable transmission with the non-slip characteristics of a gear drive. It achieves this combination with a cone drive geometry using a roller chain drive linkage continuously engaging sprockets. Variable ratios are adjusted continuously as the roller chain is moved laterally from the large diameter end of the cone to the small end or vice-versa. The latter action is similar to continuously variable transmissions using cone belt drives, but with the distinction that no slippage is possible in the present invention as the roller chain is positively engaged with sprockets, much the way gears are meshed, over the entire adjustment range.

Ratio changes can be made dynamically as in many continuously variable transmissions. The cone supports the roller chain on its surface, but it is two small keyed sprockets riding on spiral grooved shafts within the cone that protrude slightly through longitudinal slots through the cone surface that engage the roller chain.

As the ratio is changed by moving the plane of the roller chain laterally to engage a different cone diameter, the small keyed sprockets are moved with the chain, and the spiral grooves in their shafts fixed to the rotating cone rotate these keyed sprockets just the right amount so as to maintain proper phasing to perfectly engage the roller chain continuously.

A sprocket carrier element captures and aligns these small keyed sprockets in a vertical direction to engage the plane of the roller chain accurately. This carrier also is the element which moves the keyed sprockets laterally to change ratios, and it also resists further lateral movement once the ratio is set.

Since the roller chain is of a fixed size, the grooved input shaft with the drive sprocket is synchronously moved up or down relative to the cone shaft as required to maintain proper chain tension as the ratio is shifted.

While it is understood that either the cone shaft or the other shaft can be designated as input or output depending on the desired step-up or step-down ratio of an application, the single sprocket grooved shaft will be designated as the "input" while the cone shaft will be the "output" for sake of discussion of this invention.

Elements such as transmission housings and lateral or vertical adjustment mechanisms are not detailed in this invention as they are well known in the art. Adjustment mechanisms can take several forms including a hand- or motor-driven lead screw and nut, or a hydraulic cylinder. A more recently introduced device for position control is a servo controlled pneumatic cylinder with an auxiliary element using magneto-rheological fluid for added precision; this device can be used as well.

A secondary but equally important function of these lateral and vertical adjustment mechanisms is to resist forces arising out of normal operation that would tend to disturb the selected positions which correspond directly to the desired ratio.

BRIEF DESCRIPTION OF THE DRAWINGS

FIGS. 1A and 1B show side elevational views of major components of present invention; wherein:

FIG. 1A shows a low speed output setting, and

FIG. 1B shows a high speed output setting;

FIGS. 5A and 5B are close-up side elevational detail views in partial crossection of the drive cone and internal components; wherein:

FIG. 5A shows the high speed output setting, and,

FIG. 5B shows the mid-speed output setting (rotated view);

FIGS. 6A and 6B show two views of an alignment guide element in use with the present invention, wherein:

FIG. 6A shows a close-up end detail view thereof and

FIG. 6B shows a close-up side elevational detail view in partial crossection thereof;

FIGS. 7A and 7B show close-up detail views in partial crossection of the phase settings of two keyed sprockets thereof, wherein:

FIG. 7A shows the high speed configuration, and

FIG. 7B. shows a rotated low speed configuration (phase adjusted);

DETAILED DESCRIPTION OF THE INVENTION

In the description which follows, in connection with the foregoing drawing Figures, the grooved input shaft will be described which permits torsional coupling to a roller chain while permitting shifting of the sprocket along the shaft. This is via an engagement tab in the hub of the sprocket which fits in the shaft groove with a sliding fit.

It is well known that similar operation can be derived with a shaft of non round crossection with a mating sprocket hub; examples of these alternative shaft crossections are splines, square or hexagonal.

In a similar vein, spiral grooved shafts will be described as transmission elements. These are depicted as "single-start" shafts with one spiral groove. "Multi-start" shafts using two or three spiral grooves along the shaft can be used as well. Although a roller chain is specified in the description, a ladder chain or non-roller sprocket chains can be used as well.

Figure 1A:
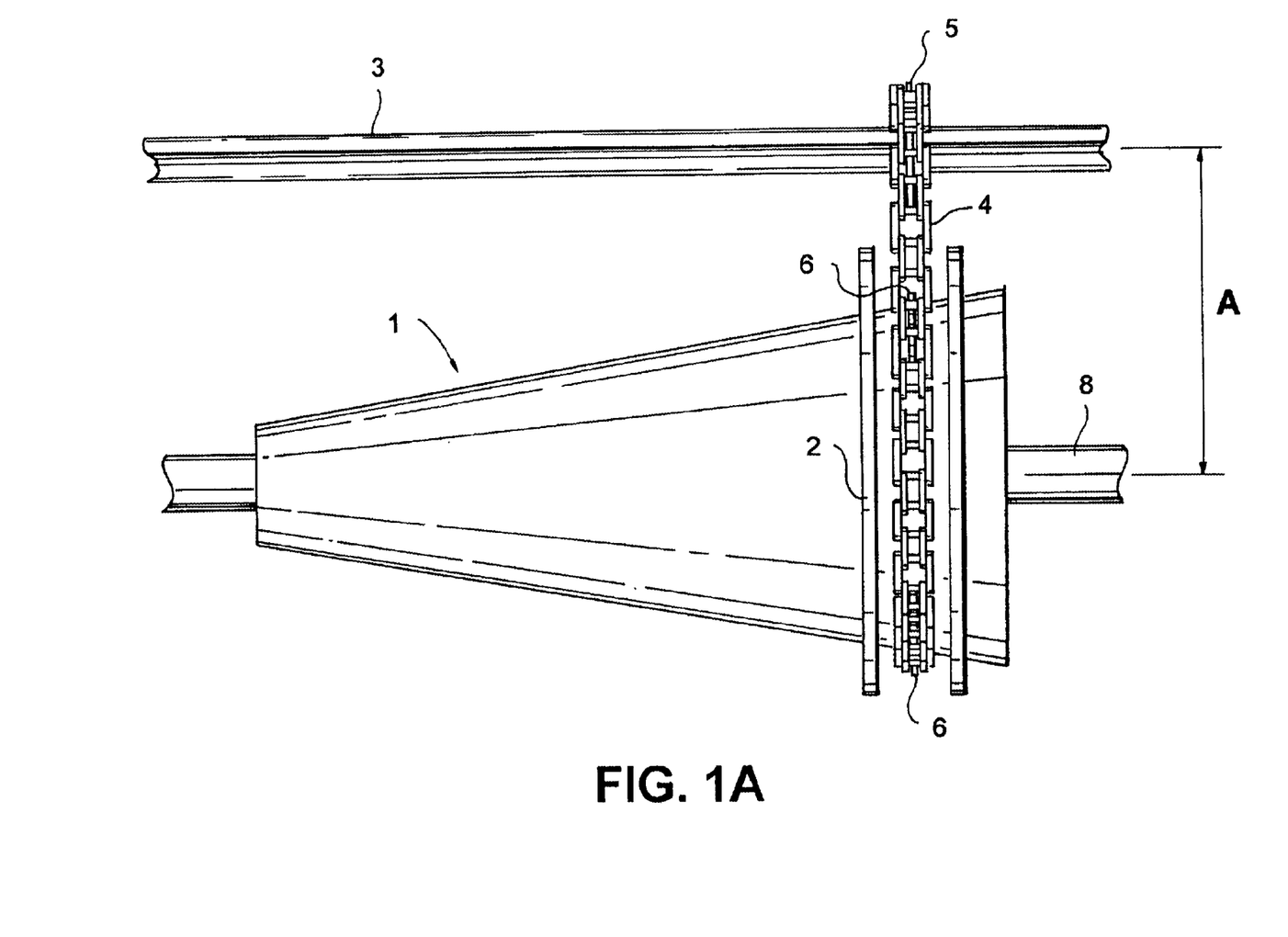
Figure 1B:
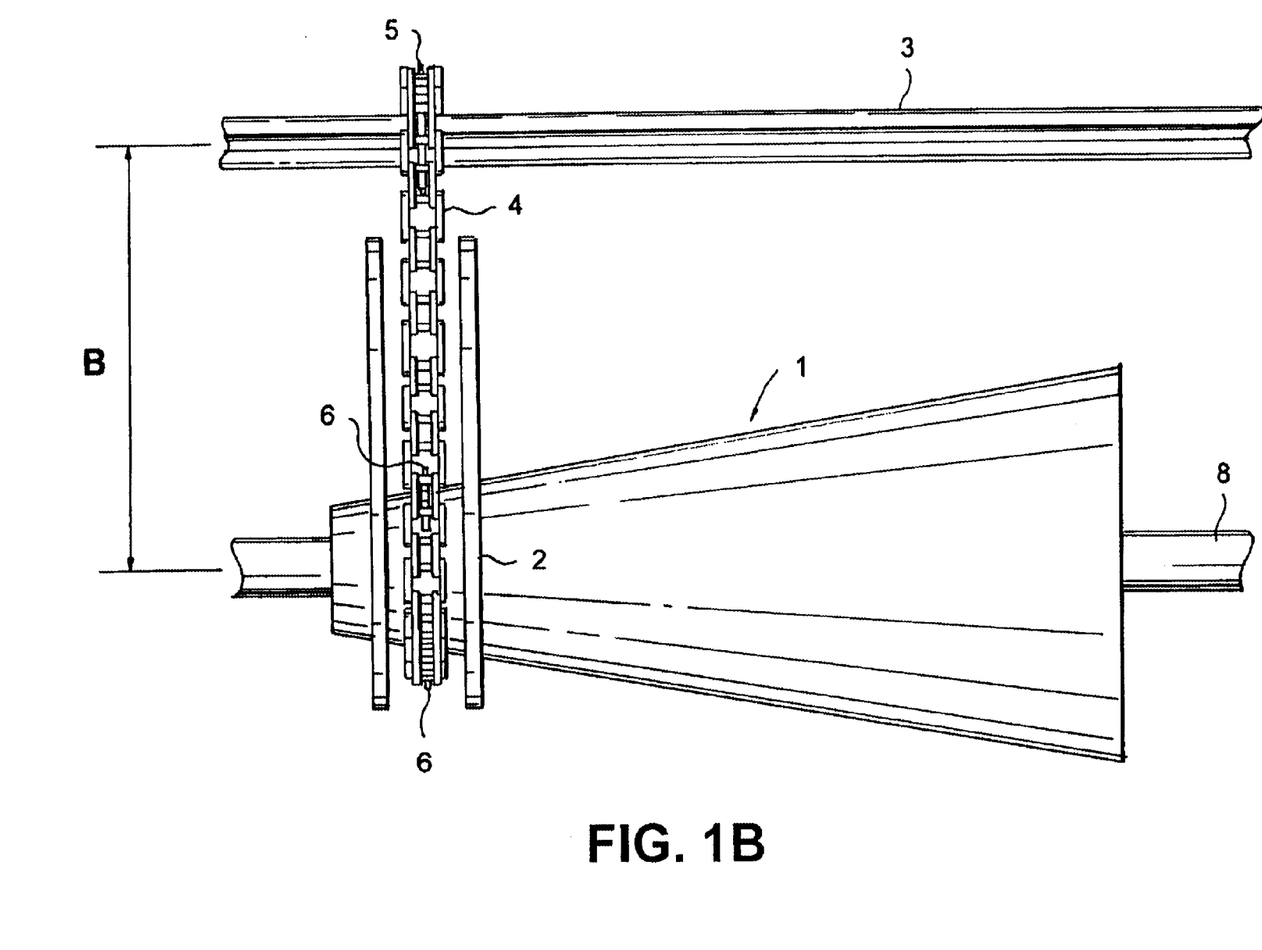

FIGS. 1A and 1B show the main configuration of the slide cone positive variable speed transmission of this invention.

For example, FIG. 1A shows the maximum numerical ratio setting (i.e.—low speed output) whereby roller chain 4 rides on the maximum diameter portion of cone 1 within sliding sprocket alignment guide 2 and driving sprocket 5 is engaged with grooved input shaft 3 at the right side. The distance between the center of cone 1 is denoted as "A".

FIG. 1B shows the corresponding view with roller chain 4 components shifted left so that roller chain 4 now rides on the smallest diameter portion of cone 1 (highest output speed relative to input) with lowest numerical step-down ratio. At that point in time, grooved input shaft 3 is now at a greater distance, "B", from the center of cone 1.

Figure 2:
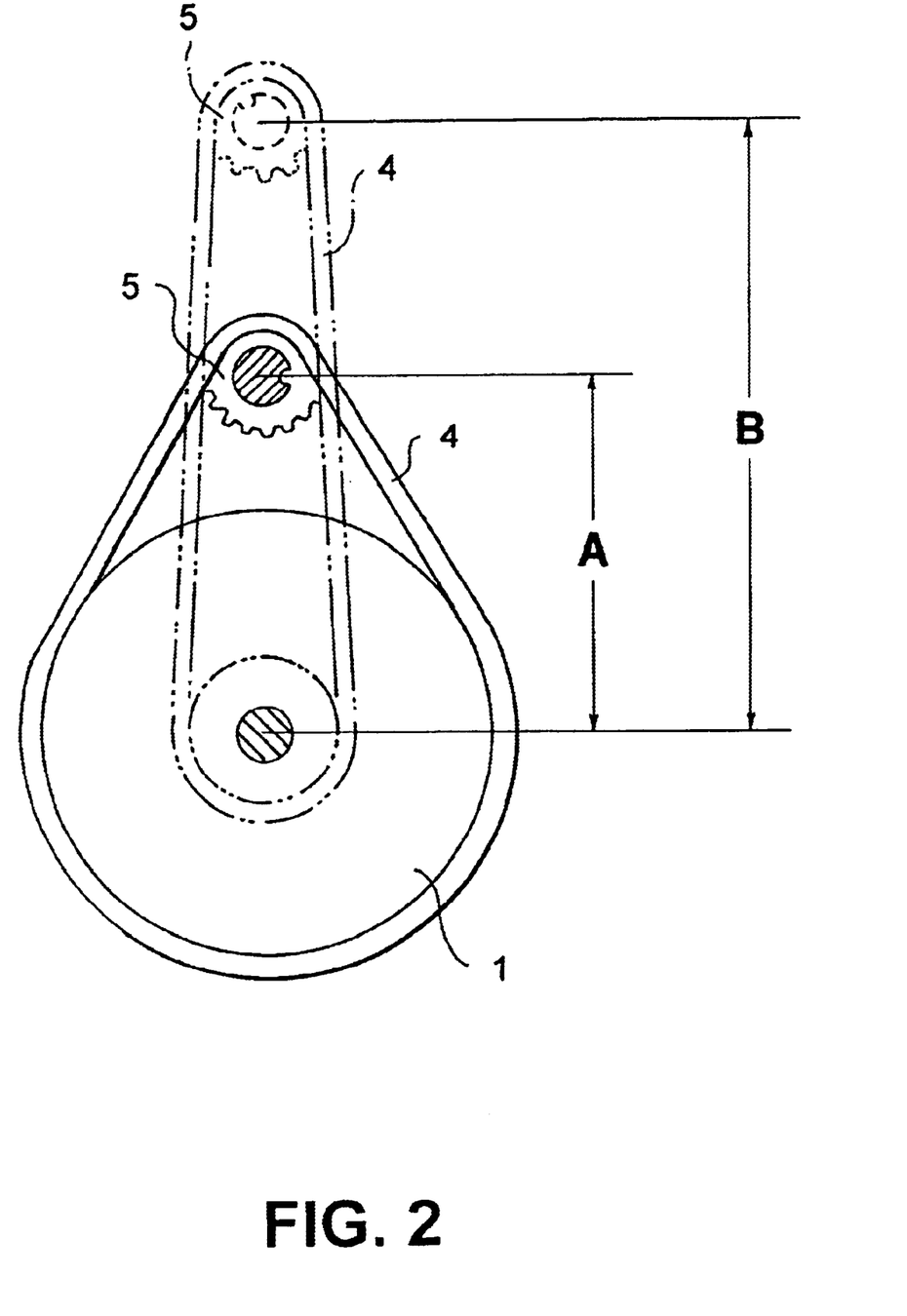
FIG. 2 is a schematic end view thereof, showing drive components in the low speed setting with the high speed configuration shown in dashed lines.

FIG. 2 is an end view of the geometry of the two positions of FIG. 1. The high speed setting is shown in dashed lines; note that in both positions (and in all positions in between) there is no slack in roller chain 4, and no idlers are required.

Figure 3:
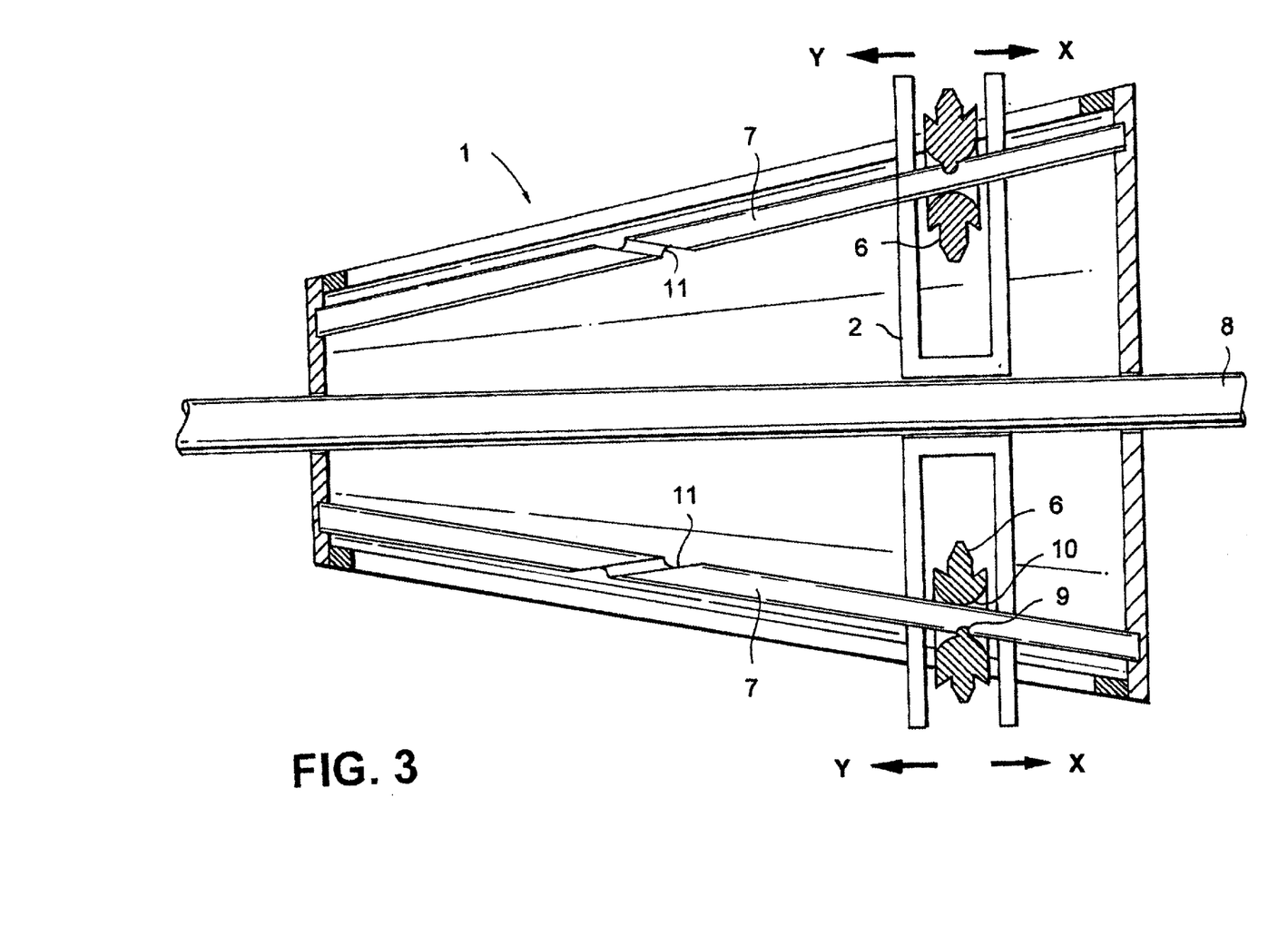
FIG. 3 is a close-up side elevational detail view in partial crossection of the drive cone internals thereof.

FIG. 3 is a side view of the internal components of cone 1 which distinguishes this transmission from prior art devices.

Spiral grooved shafts 7 are fixed and permanently attached to the ends of cone 1 in precise alignment with each other. Spiral grooved shafts 7 are placed 180 degrees apart and their twist rate is identical, but the twist directions of both spiral grooved shafts 7 are opposite to each other. The reasons for this will soon become apparent.

In FIG. 3, keyed sprocket 6 is shown in crossection to reveal a contoured inner hole 10 and nib 9 which engages the spiral groove 11 of spiral grooved shaft 7. Contour inner hole 10 permits the inner surfaces of alignment guide 2 to keep sprocket 6 aligned with roller chain 4 as it is slowly turned by the spiral groove 11 of fixed spiral groove shaft 7 during a ratio change. Alignment guide 2 is centered over cone shaft 8 but not attached to it, so that it permits guidance of chain 4 over keyed sprockets 6 in all ratio positions in a dynamic sense, as it is moved laterally along cone 1. Moreover, only the engagement teeth of sprockets 6 extend beyond the surface of cone 1, to engage chain 4 along the lateral grooves in the surface of cone 1 which are centered on spiral grooved shafts 7.

FIG. 3 also depicts that nibs 9 are part of the internal surface of center holes 10 of keyed sprockets 6. Nibs 9 are the elements that key these small sprockets 6 to spiral groove 11 of supporting spiral grooved shaft 7. Moreover, alignment guide 2 pushes keyed sprocket 6 in either direction laterally to change ratios. During these lateral movements, keyed sprockets 6 are slightly rotated by grooves 11. The input sprocket 5 has a similar nib which fits in an axially extending straight groove in input shaft 3, so that input sprocket 5 can slide back and forth on input shaft 3 while supplying torque to transmission cone 1.

As also shown in FIG. 3, normal operation causes sprockets 6 to generate forces in direction x or in direction Y on alignment guide 2 depending on the direction of cone rotation. (These forces are similar to those which drive the famous "Yankee" screw driver.) The mechanism (not shown) which positions alignment guide 2 laterally also resists these forces once the desired ratio has been set (and also during the lateral movement itself). Thus keyed sprockets 6 are locked in their positions by alignment guide 2, and cone 1 rotates as a fixed subsystem simulating the smooth engagement of a single large sprocket of the pitch diameter of the selected lateral position.

Figure 4:
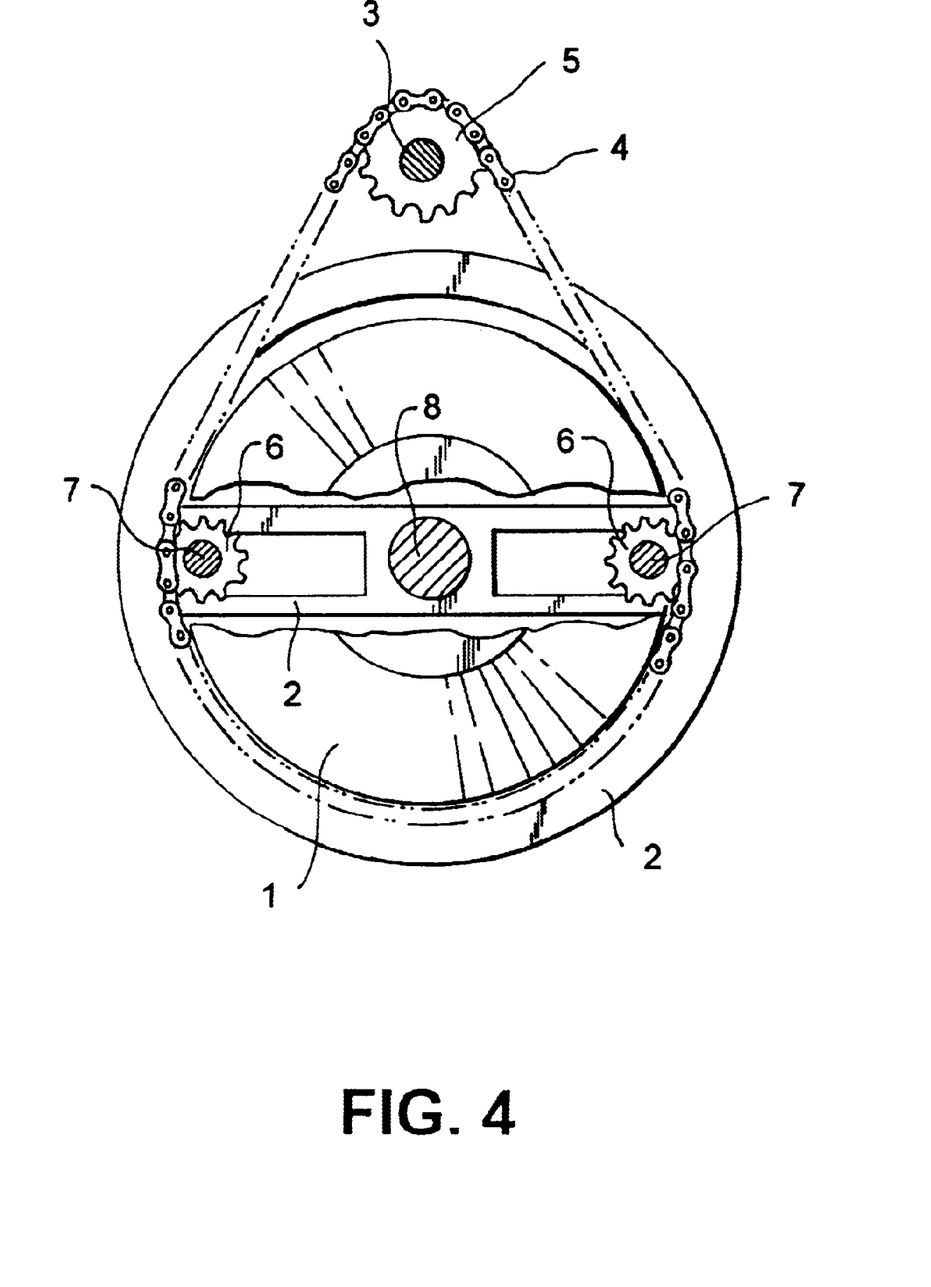
FIG. 4 is a close-up end detail view in partial crossection of the drive components thereof.

FIG. 4 is an end view also showing chain 4 and input sprocket 5 keyed to shaft 3.

Figure 5A:
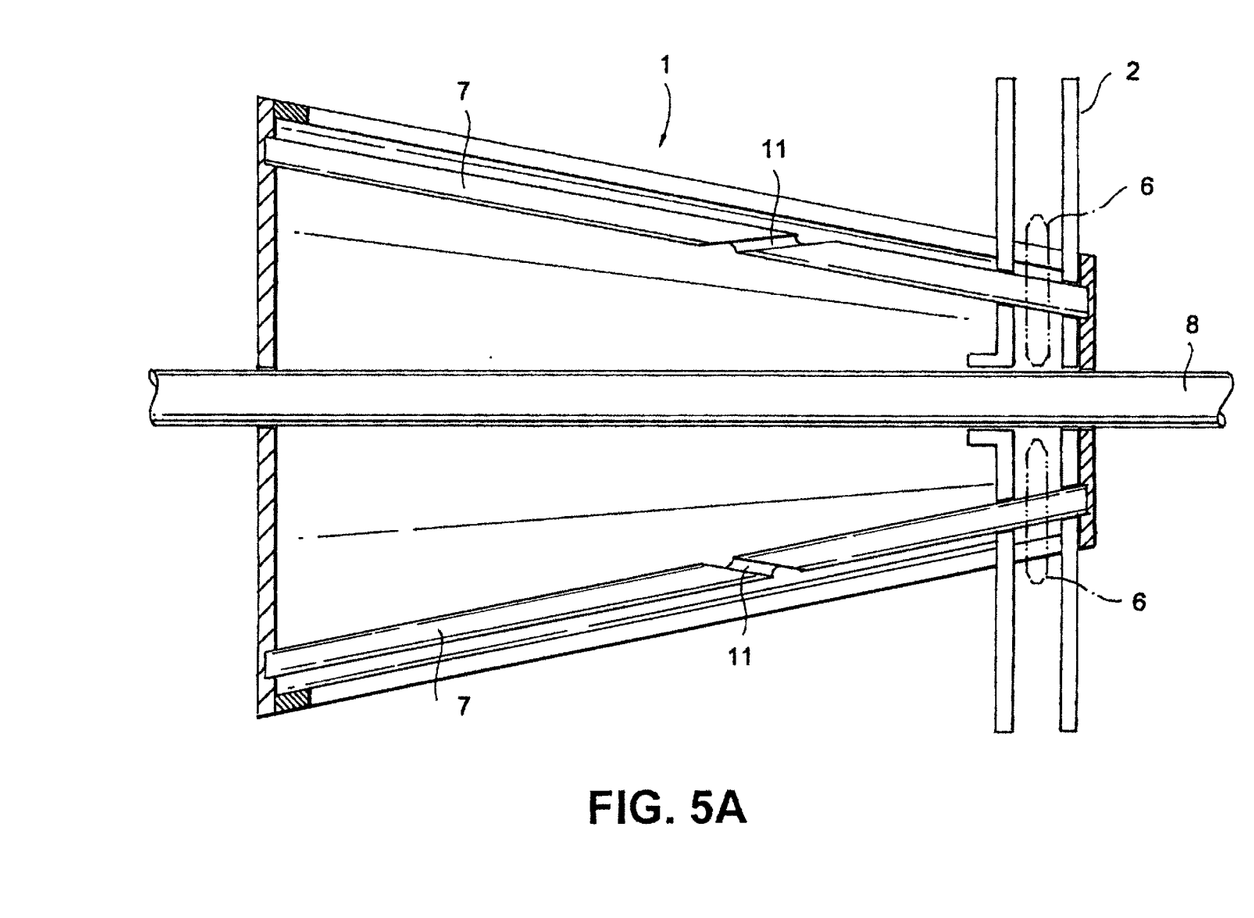
Figure 5B:
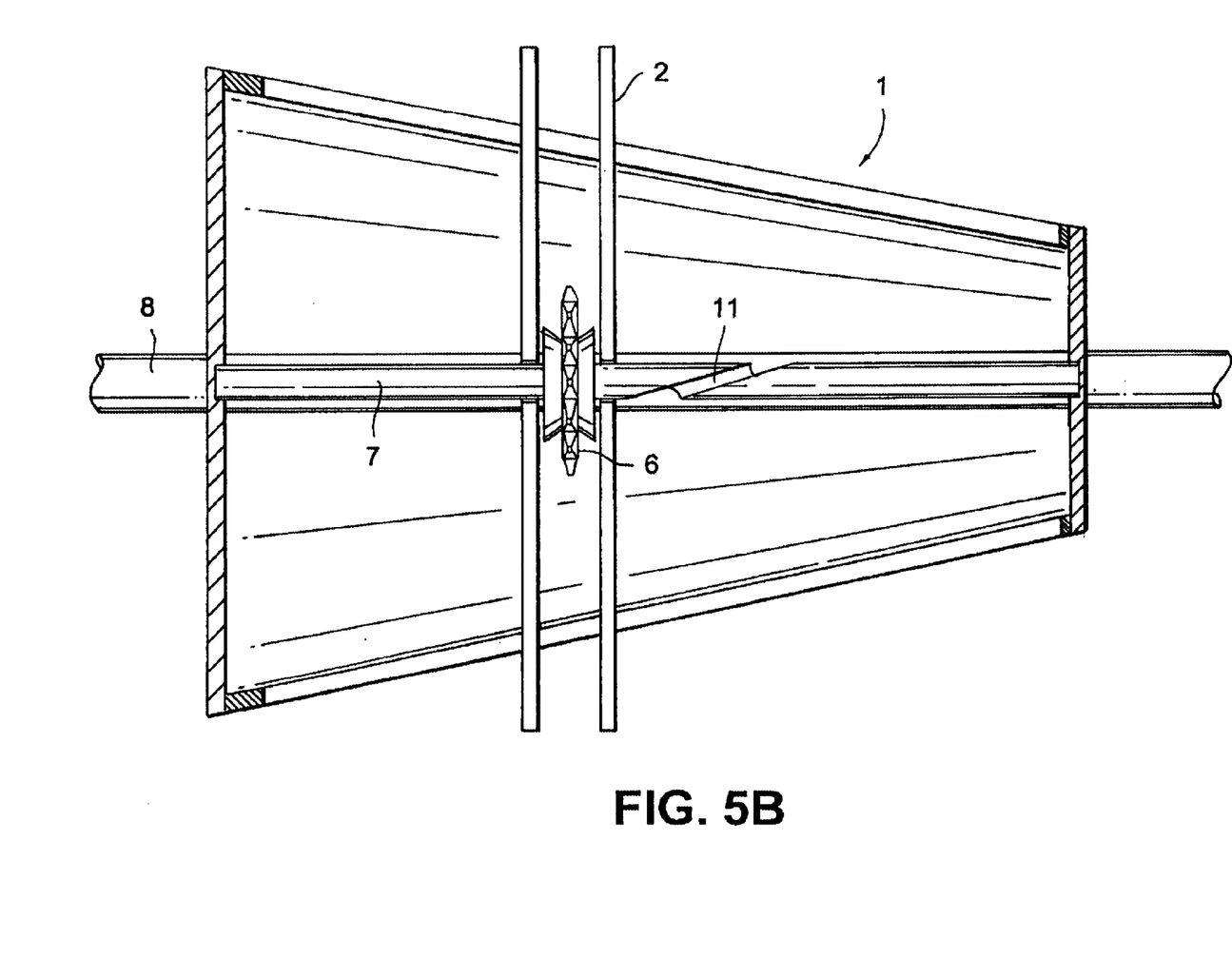

FIG. 5A shows the cone components including cone 1, spiral grooved shafts 7, keyed sprockets 6, alignment guide 2 and cone shaft 8 in a high output speed (low ratio) configuration while FIG. 5B shows a rotated view of a mid-speed (higher numerical ratio) position.

Figure 6A:
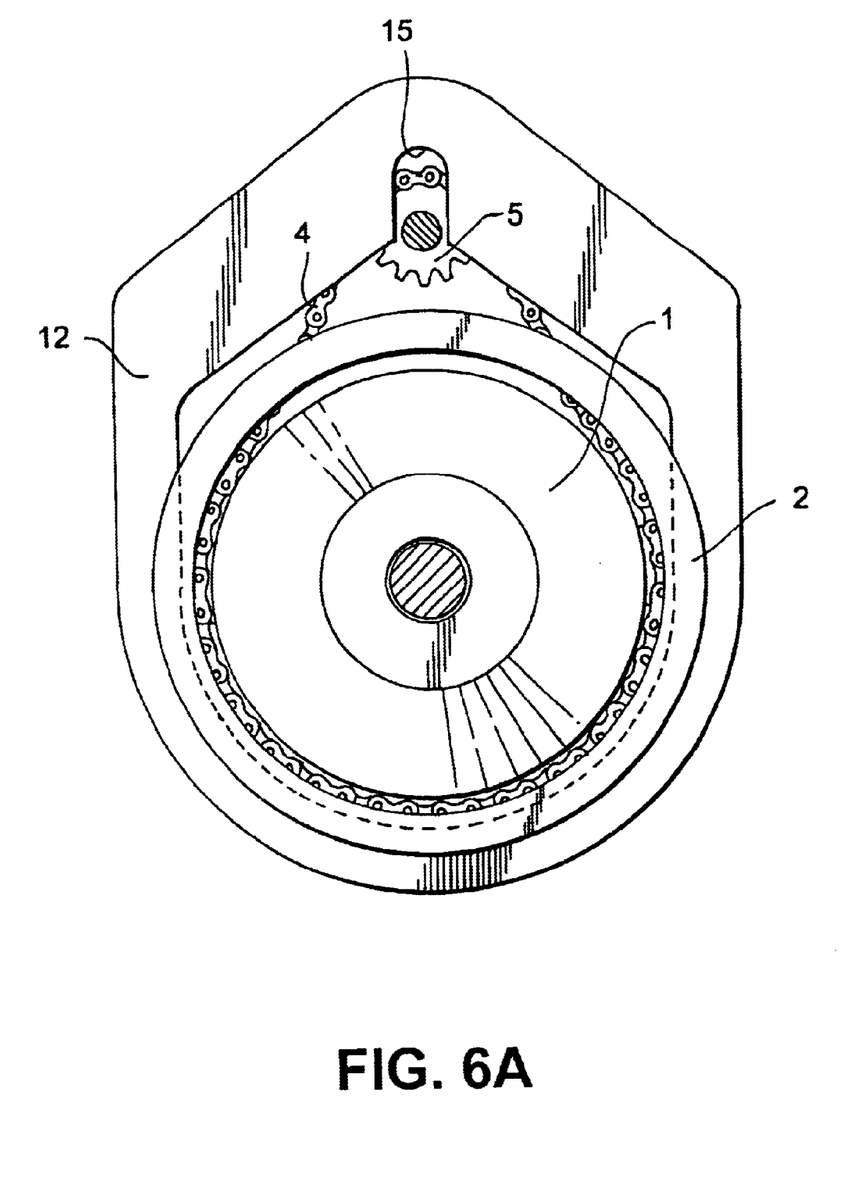
Figure 6B:
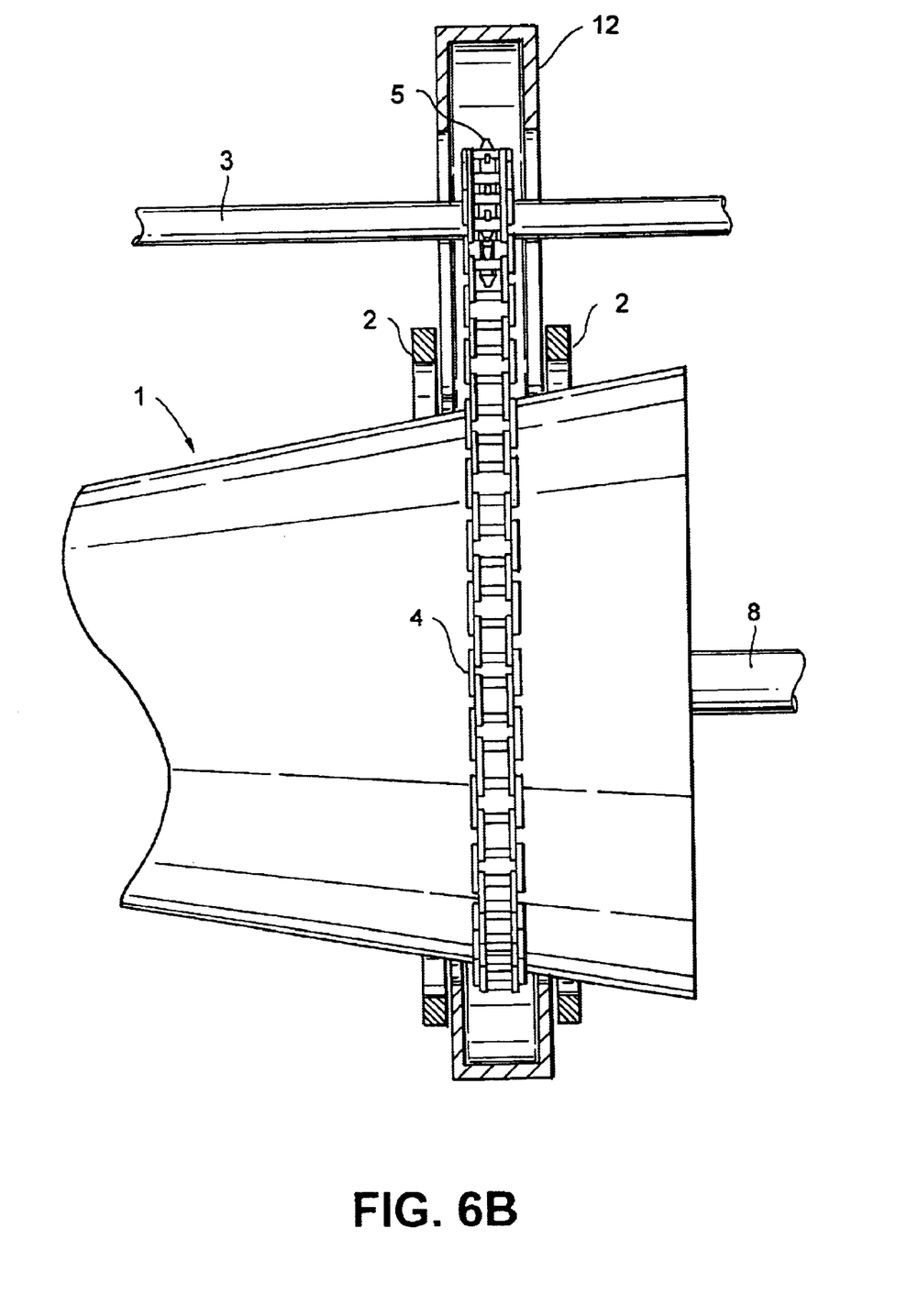

While separate synchronized positioners can be used to move input sprocket 5 and alignment guide 2 laterally to change ratios, a single positioner can be used to shift an alignment guide plate 12 laterally as shown in FIGS. 6A (end view) and 6B (side view detail). By the addition of alignment guide plate 12 with slot 15 to accommodate vertical positioning of input grooved shaft 3, chain 4, input sprocket 5 and keyed sprockets 6 are all aligned and moved laterally together. A simple bottom ramp (not shown) can be used to properly guide plate 12 in the vertical direction as it is shifted laterally to change ratios. FIG. 6B shows how guide plate 12 is fitted within alignment guide 2.

Figure 7A:
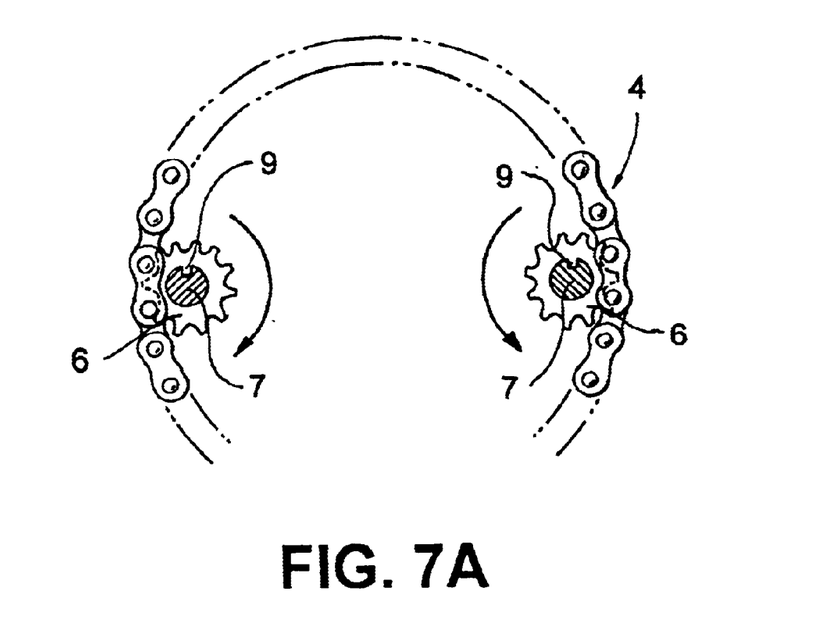
Figure 7B:
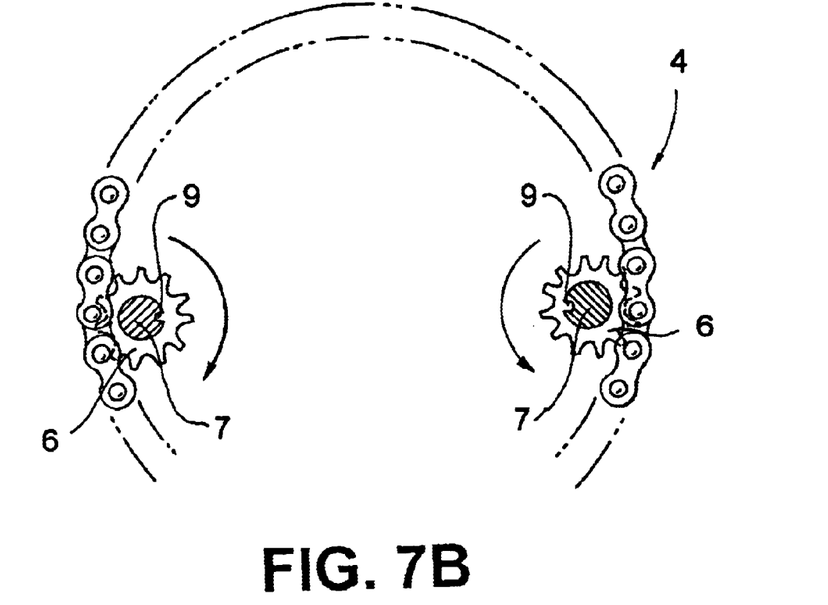

FIGS. 7A and 7B shows two detail views of sprockets 6 keyed at nib 9 to spiral grooved shafts 7 as a variation is made from a higher output speed position in FIG. 7A to a lower speed position in FIG. 7B. During this transition, sprocket 6 on the left has moved 90 degrees clockwise while sprocket 6 on the right has been shifted 90 degrees counter-clockwise. This 90 degree shift is shown for illustration purposes only, as the shift angle may vary according to the movement of the respective sprockets 6 on the right and left sides.

For proper operation of the transmission of this invention, it is necessary that the proper twist rate of the spiral grooves of spiral grooved shafts 7 be derived as a function of cone 1 geometry.

Figure 8A:
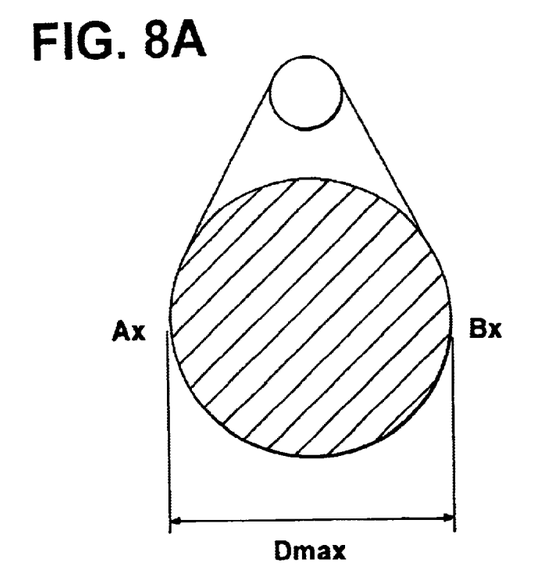
FIG. 8 is a geometric plan and mathematical analysis to derive the twist rate of the spiraled grooves thereof.
Figure 8B:
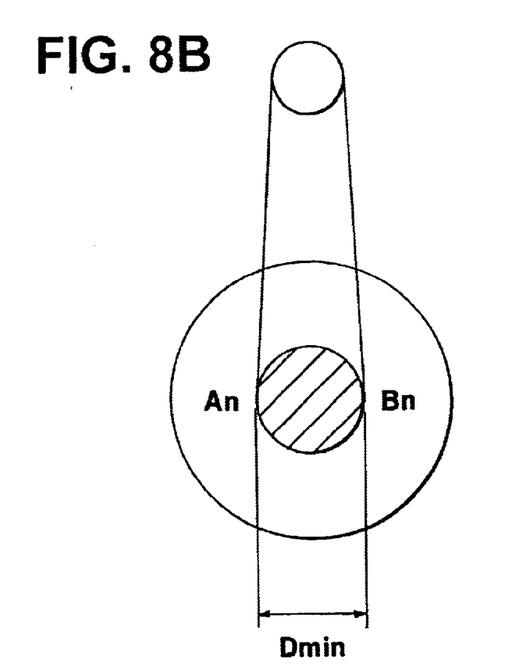

This calculation can be performed as shown in FIG. 8 by considering the two extreme positions of adjustment $D_{max}$ and Dmin, according to the following formulas:

1. $CT = \text{Chain Travel} = \frac{1}{2}\Pi\frac{D_{max}}{2} - \frac{1}{2}\Pi\frac{D_{min}}{2} = \frac{\Pi}{4}(D_{max} - D_{min})$ 2. $\text{Turn} = CT/D_D\Pi = \frac{D_{max} - D_{min}}{4D_D}$ 3. $\text{Twist rate (Degrees unit length)} = \frac{360 \text{ Turns}}{L}$ where:
   CT is the length of roller chain that must travel through each of the locking sprockets (6) on the cone from $D_{min}$ to $D_{max}$ or vice-versa.
   $D_D$ is the pitch diameter of sprockets 6.
   L is the length of a spiral grooved shaft 7.
   $A_x$, $B_x$ are points of engagement with sprockets 6 at Maximum diameter.
   $A_n$, $B_n$ are points of engagement with sprockets 6 at Minimum diameter setting.

To make the transition from $D_{max}$ to $D_{min}$ along the lateral dimension of cone 1, the length of chain that must be moved through each keyed sprocket to maintain synchronism is calculated as per formula 1. The length of chain between $A_x$ and $B_x$ wrapped around cone 1 is half the circumference at The length of chain between $A_n$ and $B_n$ is half the circumference at $D_{min}$. The difference of these two lengths must pass through the keyed sprockets. If both sprockets are turned in opposite directions at the same rate, the chain travel CT through each sprocket is one half of the total. Hence, formula 1. Formula 2 derives the number of turns of each keyed sprocket 6 as a function of CT and the pitch diameter $D_D$ of a sprocket 6. The twist rate is further derived from the TURNS in formula 3 where degrees per unit length (e.g.—inch or cm) is derived by dividing the 360 times TURNS by the slant distance between the midpoints of sprockets 6 at the $D_{max}$ and $D_{min}$ positions.

Figure 9:
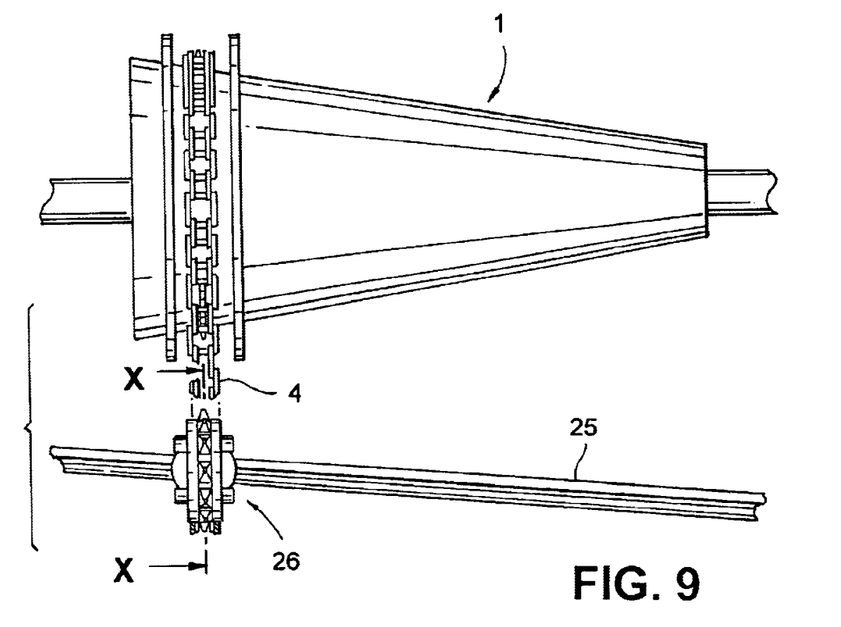
FIG. 9 is a side elevational view of the major components of an alternate embodiment of the transmission of this invention, using a fixed tilted grooved input shaft with a ball sprocket.

FIG. 9 shows an alternate embodiment of the transmission of this invention using an identical cone 1 including all cone attached components, but substituting a tilted grooved input drive shaft 25 in fixed bearings (not shown) with a ball sprocket 26 that simultaneously drives chain 4 in proper alignment and can be shifted laterally and along tilted shaft 25. This design again eliminates the need for idlers to keep chain 4 taut while permitting the input shaft to be fixed as opposed to the preferred embodiment where it is shifted vertically to eliminate slack.

Figure 10:
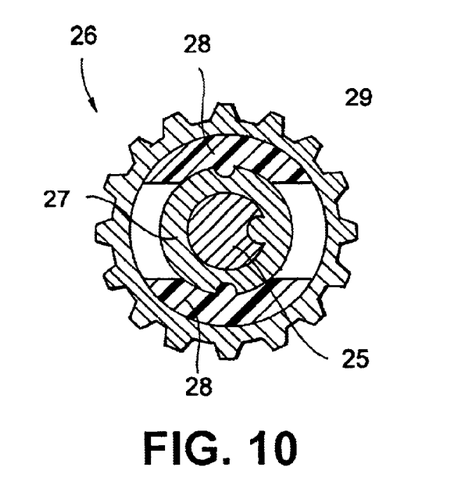
FIG. 10 is a close-up crossectional detail view of a ball sprocket of an alternate embodiment of the present invention.

FIG. 10 is a crossection of ball sprocket 26 (at x—x in FIG. 9). It includes an inner sphere 27 with a central hole and a nib which keys it to grooved shaft 25 but permits sliding movement along shaft 25. Sprocket ring 29 is attached as by welding to hollow spherical segments 28 which have internal nibs which engage mating grooves in the surface of inner sphere 27. This geometry permits the proper alignment of sprocket ring 29 with chain 4 under the guidance of an alignment guide (not shown) while driving chain 4 and being adjusted laterally.

Figure 11:
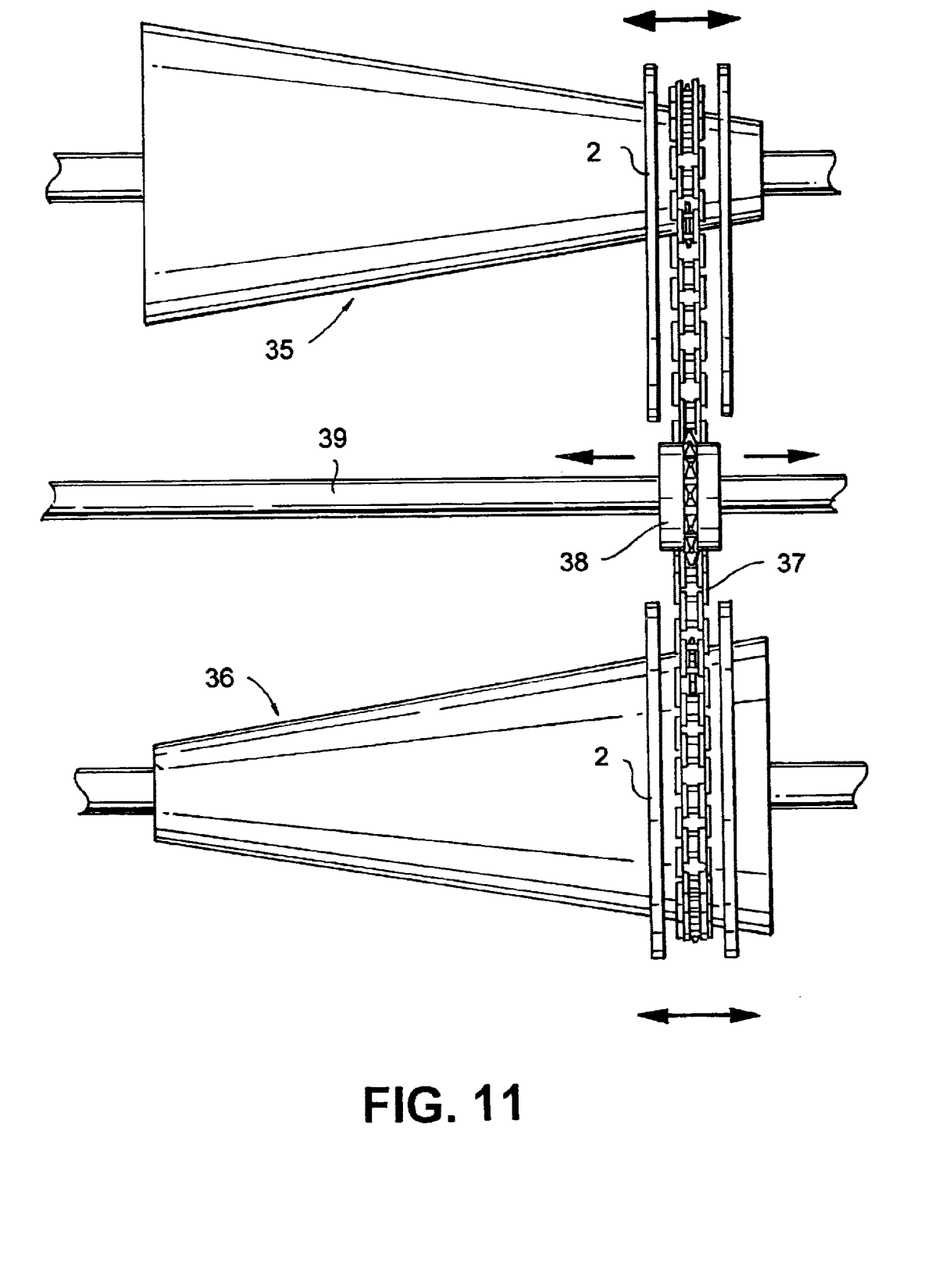
FIG. 11 is a side elevational and view of the major components of a second alternate embodiment of this invention, using dual drive cones; and, FIG. 12 is an end view of the major components of the second alternate embodiment thereof.
Figure 12:
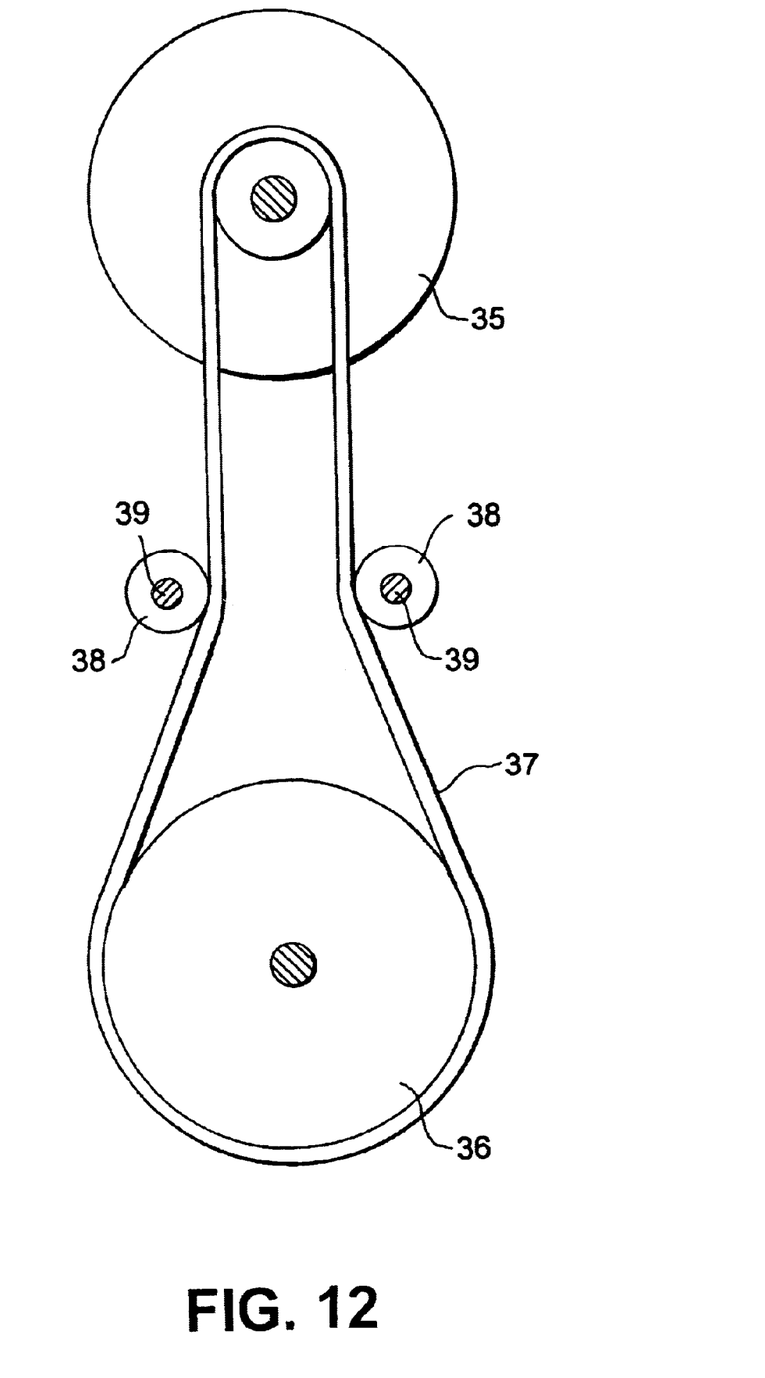

FIG. 11 is a side elevation of the major components of a second alternate embodiment of this transmission. FIG. 12 is an end view thereof. In this embodiment, two identical cones 35 and 36 are used facing in opposite directions. Each cone is identical to cone 1 in design including all of the components carried or attached to cone 1. Smooth shafts 39 carry idler sprockets 38 to keep long roller chain 37 at all positions along the lateral adjustment range.

In this transmission, one cone is an input cone 35 while the other cone 36 is the output cone. This embodiment encompasses a full range from extreme step-down ratio at the extreme right position to an extreme step-up ratio at the extreme left position. The shifting mechanism (not shown) shifts both alignment guides 2 as well as both idler pulleys 38 in a synchronous fashion to change ratios.

Both of the alternate embodiments share the desirable features of the preferred embodiment derived from the use of roller chain and proper phase control of cone sprockets, namely the combination of no slippage and continuously variable ratio control.

It is further known that other modifications may be made to the present invention that departing from the scope of the present invention, as noted in the appended claims.

I claim:

1. A continuously variable transmission comprising:
   a cone shaped member;
   said cone shaped member having a cone shaft centrally positioned therethrough;
   said cone shaped member having a first and a second fixed spiral grooved shaft therein, said first and said second fixed spiral grooved shafts having respectively a spiral groove and each of said spiral grooves having an equal spiral rate,
   wherein said spiral groove in said first fixed spiral grooved shaft spirals in a direction 180 degrees from the direction of said spiral groove in said second fixed spiral grooved shaft, and wherein said first and said second fixed grooved shafts are positioned opposite each other;
   a sliding alignment guide being located within said cone shaped member such that said cone shaft is centrally located therethrough and said alignment guide is not attached to said cone shaft, allowing said alignment guide to move laterally within said cone shaped member,
   said alignment guide having a first end interacting with a first keyed sprocket having engagement teeth and an internal nib,
   said first keyed sprocket supported by and engaged with said spiraled groove of said first spiraled grooved shaft and a second end interacting with a second keyed sprocket having further engagement teeth and an internal nib,
   said second keyed sprocket supported by and engaged with said spiraled groove of said second spiraled grooved shaft,
   wherein only said engagement teeth of said first and said second keyed sprockets extend beyond an outside surface of said cone shaped member;
   a chain interlinking with said engagement teeth of said first and said second keyed sprockets, said chain cradling said outside surface of said cone shaped member and interlinking with an input driving sprocket;
   said input driving sprocket having a grooved input shaft therethrough, and a nib engaging said spiral groove, to rotate and supply driving torque, and allowing said input driving sprocket and said chain to move laterally along said grooved input shaft and laterally along said outside of said cone shaped member, said grooved input shaft being located a variable distance from said cone shaped member throughout said lateral movement of said chain and said input driving sprocket, thereby keeping said chain taut; and wherein further, said lateral movement of said alignment guide, said lateral movement of said input driving sprocket and said lateral movement of said chain are synchronous and in substantially the same direction.

2. A continuously variable transmission as claimed in claim 1 wherein said chain is a roller chain.

3. A continuously variable transmission as claimed in claim 1 wherein said chain is a ladder chain.

4. A continuously variable transmission as claimed in claim 1 wherein said chain is a non-roller chain.

5. A continuously variable transmission comprising:

a cone shaped member;

said cone shaped member having a cone shaft centrally positioned therethrough;

said cone shaped member further having a first and a second fixed spiral grooved shaft therein, said first and said second fixed spiral grooved shafts each having a spiral groove and each said spiral groove having an equal spiral rate, wherein said spiral groove in said first fixed spiral grooved shaft spirals in a direction 180 degrees from the direction of said spiral groove in said second fixed spiral grooved shaft, wherein said first and said second fixed grooved shafts are positioned opposite each other;

a sliding alignment guide located within said cone shaped member such that said cone shaft is centrally located therethrough and said alignment guide is not attached to said cone shaft, allowing said alignment guide to move laterally within said cone shaped member, said alignment guide having a first end interacting with a first keyed sprocket having engagement teeth, and an internal nib, said first keyed sprocket supported by, and engaged with, said spiral groove of said first spiraled grooved shaft, and a second end interacting with a second keyed sprocket having engagement teeth, and an internal nib, said first keyed sprocket being supported by and engaged with said spiral groove of said second spiraled grooved shaft, wherein only said engagement teeth of said first and said second keyed sprockets extend beyond an outside surface of said cone shaped member;

a chain interlinking with said engagement teeth of said first and said second keyed sprockets, said chain cradling said outside surface of said cone shaped member and interlinking with a ball sprocket;

said ball sprocket having a tilted grooved input shaft therethrough, thereby allowing said ball sprocket and said chain to rotate, and allowing said ball sprocket and said chain to move along said tilted grooved input shaft and laterally along said outside of said cone shaped member, said tilted grooved input shaft being located a fixed distance from said cone shaped member thereby keeping said chain taut; and, wherein further, said lateral movement of said alignment guide, said lateral movement of said ball sprocket and said lateral movement of said chain are synchronous and in substantially the same direction.

6. A continuously variable transmission as claimed in claim 5 wherein said ball sprocket comprises:

an inner sphere, said inner sphere having an inner nibbed portion on an inner surface of said inner sphere and a central hole therethrough, said inner sphere having grooves on an outer surface of said inner sphere;

said inner nibbed portion engaging with said groove in said tilted grooved input shaft;

said ball sprocket having spherical segments having internal nibs, which said internal nibs engage with said grooves on an outer surface of said inner sphere and said spherical segments having hollow portions; and wherein a sprocket ring is attached to said spherical segments.

7. A continuously variable transmission as claimed in claim 6 wherein said chain is a roller chain.

8. A continuously variable transmission as claimed in claim 6 wherein said chain is a ladder chain.

9. A continuously variable transmission as claimed in claim 6 wherein said chain is a non-roller chain.

10. A continuously variable transmission comprising:

a first cone shaped member and a second cone shaped member, wherein said first and said second cone shaped members are facing in opposite directions;

said first and said second cone shaped member each having a cone shaft centrally positioned therethrough;

said first and said second cone shaped member each having a first and a second fixed spiral grooved shaft therein, each said first and each said second fixed spiral grooved shafts having respectively a spiral groove and each said spiral groove having an equal spiral rate, wherein said spiral groove in each said first fixed spiral grooved shaft spirals in a direction 180 degrees from the direction of said spiral groove in each said second fixed spiral grooved shaft, wherein further said first and said second fixed grooved shafts are positioned opposite each other in said first cone shaped member and said first and said second fixed grooved shafts are positioned opposite each other in said second cone shaped member;

said first cone member and said second cone member each having a sliding alignment guide located within said cone shaped member such that each said cone shaft is centrally located therethrough and each said alignment guide is not attached to said cone shaft, allowing each said alignment guide to move laterally within each said cone shaped member;

each said alignment guide having a first end interacting with a keyed sprocket having engagement teeth and an internal nib, said first keyed sprocket supported by and engaged with said spiral groove of said first spiraled groove shaft, and, said alignment guide further having a second end interacting with a second keyed sprocket having engagement teeth, and an internal nib, said second keyed sprocket being supported by and engaged with said spiraled groove of said second spiraled groove shaft, wherein only said engagement teeth of said first and said second keyed sprockets extend beyond an outside surface of said cone shaped member;

a chain interlinking with said engagement teeth of said first and said second keyed sprockets in each of said cone shaped members, said chain cradling said outside surface of each said cone shaped member and interlinking with a first and a second idler sprocket and said first and said second idler sprockets being positioned opposite each other and being located on an outside of said cradle;

wherein said first idler sprocket rotates on a first smooth shaft and said second idler sprocket rotates on a second smooth shaft, thereby allowing said first and said second idler sprocket and said chain to rotate, and allowing said first and said second idler sprocket and said chain to move laterally along each said smooth shaft and laterally along said outside of each said cone shaped member, each said smooth shaft being located a fixed distance from each said cone shaped member throughout said lateral movement of said chain, thereby keeping said chain taut; and said lateral movement of said alignment guide, said lateral movement of each of said idler sprockets and said lateral movement of said chain are synchronous and in substantially the same direction.

11. A continuously variable transmission as claimed in claim 10 wherein said chain is a roller chain.

12. A continuously variable transmission as claimed in claim 10 wherein said chain is a ladder chain.

13. A continuously variable transmission as claimed in claim 10 wherein said chain is a non-roller chain.

* * * * *